(12) United States Patent
Wang et al.

(10) Patent No.: US 11,599,594 B2
(45) Date of Patent: Mar. 7, 2023

(54) METHOD, APPARATUS, ELECTRONIC DEVICE AND STORAGE MEDIUM FOR DATA PROCESSING

(71) Applicant: BEIJING BAIDU NETCOM SCIENCE TECHNOLOGY CO., LTD., Beijing (CN)

(72) Inventors: Yaqing Wang, Beijing (CN); Dejing Dou, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/829,113

(22) Filed: May 31, 2022

(65) Prior Publication Data

US 2022/0292145 A1    Sep. 15, 2022

(30) Foreign Application Priority Data

Aug. 6, 2021  (CN) .......................... 202110901941.2

(51) Int. Cl.
| | |
|---|---|
| *G06F 16/955* | (2019.01) |
| *G06F 16/9532* | (2019.01) |
| *G06F 16/906* | (2019.01) |
| *G06F 16/903* | (2019.01) |
| *G06F 16/9538* | (2019.01) |

(52) U.S. Cl.
CPC .......... *G06F 16/955* (2019.01); *G06F 16/906* (2019.01); *G06F 16/90335* (2019.01); *G06F 16/9532* (2019.01); *G06F 16/9538* (2019.01)

(58) Field of Classification Search
CPC .. G06F 16/955; G06F 16/9532; G06F 16/906; G06F 16/90335; G06F 16/9538
See application file for complete search history.

(56) References Cited

U.S. PATENT DOCUMENTS

2017/0039502 A1*  2/2017  Guman ............ G06Q 10/06393

* cited by examiner

*Primary Examiner* — Baoquoc N To
(74) *Attorney, Agent, or Firm* — Kilpatrick Townsend & Stockton LLP

(57) ABSTRACT

A method for data processing is provided. The method includes obtaining first retrieving data associated with a first user and a first retrieving result selected by the first user from at least one retrieving result corresponding to the first retrieving data. The first retrieving data is labelled with an intention tag indicating a retrieving intention of the first user. The method further includes obtaining second retrieving data that is used by a second user to conduct retrieving and selecting the first retrieving result within a predetermined time period. The method further includes assigning the intention tag to the second retrieving data.

15 Claims, 4 Drawing Sheets

METHOD, APPARATUS, ELECTRONIC DEVICE AND STORAGE MEDIUM FOR DATA PROCESSING

CROSS REFERENCE TO RELATED APPLICATION

This application claims priority to Chinese Patent Application No. 202110901941.2 filed on Aug. 6, 2021, the contents of which are hereby incorporated by reference in their entirety for all purposes.

TECHNICAL FIELD

The present disclosure relates to the field of artificial intelligence, particularly relates to an intention recognition technology, and specifically relates to a method, an apparatus, an electronic device, a computer readable storage medium and a computer program product for data processing.

BACKGROUND

When a user conducts search or retrieving on the input retrieving data through a search engine, the intention recognition for these retrieving data may be used to analyze the user's retrieving requirements, such as looking for movies, novels, or encyclopedia knowledge and so on. Different requirements would lead to differences in terms of the underlying retrieving strategy. The intention recognition that is not correct may cause a failure for retrieving the contents that meet the user's requirements. Therefore, the accurate intention recognition is particularly important in practical applications.

Methods described in this section are not necessarily those previously envisaged or adopted. Unless otherwise specified, it should not be assumed that any method described in this section is considered the prior art only because it is included in this section. Similarly, unless otherwise specified, the issues raised in this section should not be considered to have been universally acknowledged in any prior art.

SUMMARY

The present disclosure provides a method, an apparatus, an electronic device, a computer readable storage medium and a computer program product for data processing.

According to an aspect of the present disclosure, a method for data processing is provided, including obtaining first retrieving data associated with a first user and a first retrieving result selected by the first user from at least one retrieving result corresponding to the first retrieving data, wherein the first retrieving data is labelled with an intention tag indicating a retrieving intention of the first user; obtaining second retrieving data that is used by a second user to conduct retrieving and selecting the first retrieving result within a predetermined time period; and assigning the intention tag to the second retrieving data.

According to another aspect of the present disclosure, an electronic device is provided, including at least one processor; and a memory in communication connection with the at least one processor, wherein the memory stores instructions executable by the at least one processor, and the instructions, when executed by the at least one processor, cause the at least one processor to perform the method as described above.

According to another aspect of the present disclosure, a non-transitory computer readable storage medium storing computer instructions is provided, wherein the computer instructions are configured to cause a computer to perform the method as described above.

It should be understood that the content described in this part is not intended to identify key or important features of the embodiments of the present disclosure, nor is it used to limit the scope of the present disclosure. Other features of the present disclosure will be easily understood by the following description.

BRIEF DESCRIPTION OF THE DRAWINGS

The accompanying drawings exemplarily illustrate embodiments and form part of the description, which, together with the textual description of the description, is used to explain example implementations of the embodiments. The illustrated embodiments are for illustrative purposes only and do not limit the scope of the claims. In all the drawings, the same reference numerals refer to similar but not necessarily identical elements.

DETAILED DESCRIPTION

Figure 1:
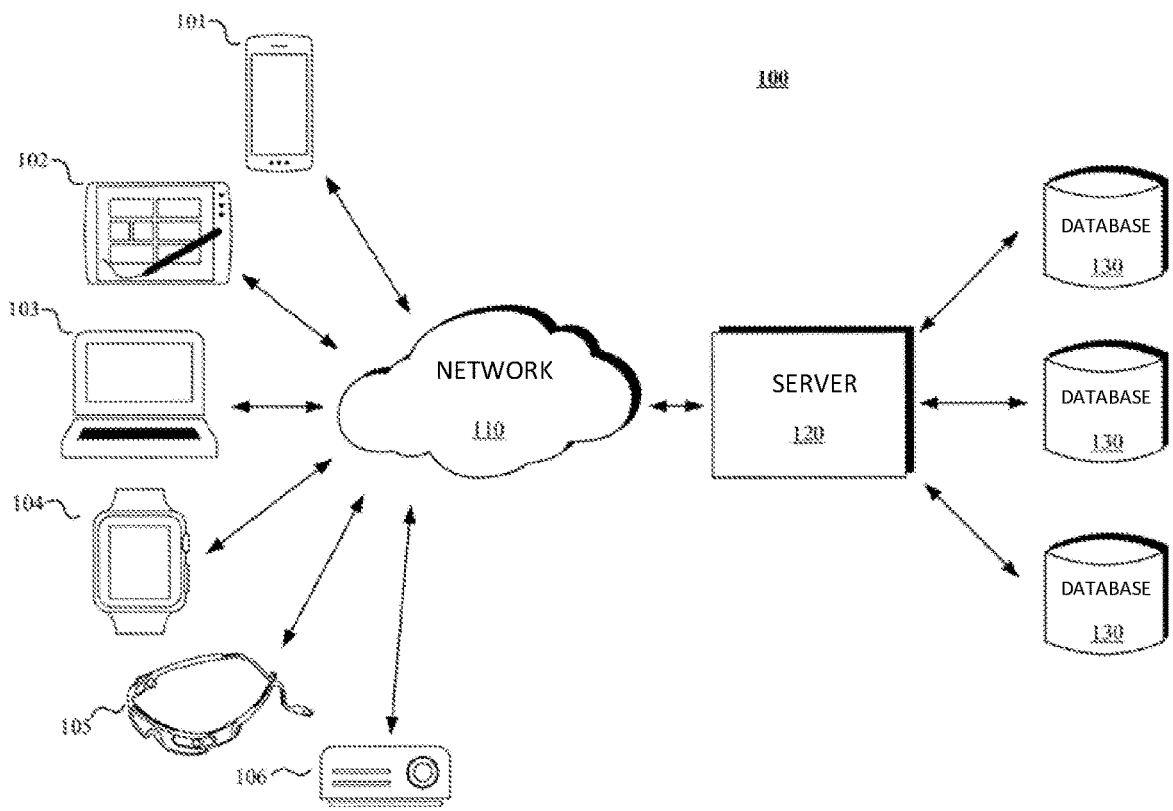
FIG. 1 shows a schematic diagram of an example system in which various methods and apparatuses described herein may be implemented according to an embodiment of the present disclosure.

The example embodiments of the present disclosure are described below in combination with the accompanying drawings, including various details of the embodiments of the present disclosure to facilitate understanding, which should be considered as only an example. Therefore, those of ordinary skill in the art should recognize that various changes and modifications may be made to the embodiments described herein without departing from the scope of the present disclosure. Similarly, for clarity and conciseness, the description of well-known functions and structures is omitted from the following description.

In the present disclosure, unless otherwise specified, the terms "first", "second" and the like are used to describe various elements and are not intended to limit the positional relationship, temporal relationship or importance relationship of these elements. These terms are only used to distinguish one element from another element. In some examples, a first element and a second element may point to the same instance of the element, and in some cases, based on the context description, they can also refer to different instances.

The terms used in the description of the various examples in the present disclosure are only for the purpose of describing specific examples and are not intended to be limiting.

Unless the context clearly indicates otherwise, if the number of elements is not specifically limited, the element may be one or more. In addition, the term "and/or" as used in the present disclosure covers any and all possible combinations of the listed items.

In the related art, in the case that the retrieving data involves with a short text, it usually may not possess a sufficient context and may lack a rigid grammatical structure, which might lead to difficulties in the intention recognition for the retrieving data. In addition, the intention recognition usually needs to be fine-grained, so that the user requirements can be classified in details. The properties of the short text would make it difficult to perform such fine-grained intention recognition. In particular, for certain highly professional retrieving data, such as the medicine-related retrieving data, it is not only necessary to analyze that the retrieving data is about a medication query, but also to distinguish whether the user specifically needs the medication guidelines, the contraindications, the drug price comparison, etc. In this case, labelling these fine-grained intentions often requires participation of the highly professional personnel, such as medical experts. However, this may lead to a large consumption of time and cost. Therefore, for these highly professional retrieving data, there is often a lack of corresponding labelled data or only a small amount of labelled data is involved, which is not beneficial for the subsequent training of a model for short text classification.

Aiming at the above problems, a method for data processing is provided according to an aspect of the present disclosure. The embodiments of the present disclosure will be described in detail below in combination with the accompanying drawings.

FIG. 1 shows a schematic diagram of an example system 100 in which various methods and apparatuses described herein may be implemented according to an embodiment of the present disclosure. Referring to FIG. 1, the system 100 includes one or more client devices 101, 102, 103, 104, 105 and 106, a server 120 and one or more communication networks 110 coupling the one or more client devices to the server 120. The client devices 101, 102, 103, 104, 105 and 106 may be configured to execute one or more applications.

In the embodiment of the present disclosure, the server 120 may run one or more services or software applications enabling the method for data processing according to the embodiment of the present disclosure.

In certain embodiments, the server 120 may further provide other services or software applications that may include non-virtual environments and virtual environments. In certain embodiments, these services may be provided as web-based services or cloud services, such as being provided to users of the client devices 101, 102, 103, 104, 105 and/or 106 under a software as a service (SaaS) model.

In a configuration as shown in FIG. 1, the server 120 may include one or more components implementing functions executed by the server 120. These components may include a software component, a hardware component or their combinations that may be executed by one or more processors. The users operating the client devices 101, 102, 103, 104, 105 and/or 106 may sequentially utilize one or more client applications to interact with the server 120 so as to utilize the services provided by these components. It should be understood that various different system configurations are possible, which may be different from those of the system 100. Therefore, FIG. 1 is an example of a system for implementing the various methods described herein, and is not intended to be limiting.

A data source for the method for data processing according to the embodiment of the present disclosure may be provided by the users using the client devices 101, 102, 103, 104, 105 and/or 106. The client devices may provide interfaces enabling the users of the client devices to be capable of interacting with the client devices. The client devices may further output information to the users via the interfaces. Although FIG. 1 only depicts six client devices, those skilled in the art can understand that the present disclosure may support any number of client devices.

The client devices 101, 102, 103, 104, 105 and/or 106 may include various types of computer devices, such as a portable handheld device, a general-purpose computer (such as a personal computer and a laptop computer), a workstation computer, a wearable device, a gaming system, a thin client, various message transceiving devices, a sensor or other sensing devices, etc. These computer devices may run various types and versions of software applications and operating systems, such as Microsoft Windows, Apple iOS, UNIX-like operating systems, and Linux or Linux-like operating systems (such as Google Chrome OS); or include various mobile operating systems, such as Microsoft Windows Mobile OS, iOS, Windows Phone and Android. The portable handheld device may include a cell phone, a smart phone, a tablet computer, a personal digital assistant (PDA) and the like. The wearable device may include a head-mounted display and other devices. The gaming system may include various handheld gaming devices, gaming devices supporting the Internet and the like. The client devices can execute various different applications, such as various Internet-related applications, communication applications (such as e-mail applications), and short message service (SMS) applications, and may use various communication protocols.

The network 110 may be any type of network well known to those skilled in the art, which may use any one of various available protocols (including but not limited to TCP/IP, SNA, IPX, etc.) to support data communication. Only as examples, one or more networks 110 may be a local area network (LAN), an Ethernet-based network, a token ring, a wide area network (WAN), the Internet, a virtual network, a virtual private network (VPN), an intranet, an external network, a public switched telephone network (PSTN), an infrared network, a wireless network (e.g., Bluetooth, WiFi), and/or any combination of these and/or other networks.

The server 120 may include one or more general-purpose computers, dedicated server computers (e.g., PC (personal computer) servers, UNIX servers, and midrange servers), blade servers, mainframe computers, server clusters, or any other suitable arrangement and/or combination. The server 120 may include one or more virtual machines running virtual operating systems, or other computing frameworks involving virtualization (e.g., one or more flexible pools of logical storage devices that may be virtualized to maintain virtual storage devices of the server). In various embodiments, the server 120 may run one or more services or software applications providing the functions described below.

A computing unit in the server 120 may run one or more operating systems including any above operating system and any commercially available server operating system. The server 120 may further run any one of various additional server applications and/or intermediate layer applications, including an HTTP server, an FTP server, a CGI server, a JAVA server, a database server and the like.

In some implementations, the server 120 may include one or more applications to analyze and combine the data feed and/or the event updating received from the users of the client devices 101, 102, 103, 104, 105 and 106. The server 120 may further include one or more applications to display the data feed and/or the real-time events via one or more display devices of the client devices 101, 102, 103, 104, 105 and 106.

In some implementations, the server 120 may be a server of a distributed system, or a server combined with a block chain. The server 120 may also be a cloud server, or a smart cloud computing server or smart cloud host with the artificial intelligence technology. The cloud server is a host product in a cloud computing service system to solve the problems for difficult management and weak business expansion in a traditional physical host and Virtual Private Server (VPS) services.

The system 100 may further include one or more databases 130. In certain embodiments, these databases may be used to store data and other information. For example, one or more of the databases 130 may be used to store, for example, information of video files and video files. The database 130 may reside at various positions. For example, the database used by the server 120 may be local to the server 120 or may be away from the server 120 and may communicate with the server 120 via and based on a network or specific connection. The database 130 may be of different types. In certain embodiments, the database used by the server 120 may be a relational database. One or more of these databases may respond to a command to store, update and retrieving data to and from the databases.

In certain embodiments, one or more of the databases 130 may further be used by applications to store application data. The databases used by the applications may be different types of databases, such as a key value storage base, an object storage base or a conventional storage base supported by a file system.

The system 100 of FIG. 1 may be configured and operated in various modes so as to be capable of applying various methods and apparatuses described according to the present disclosure.

Figure 2:
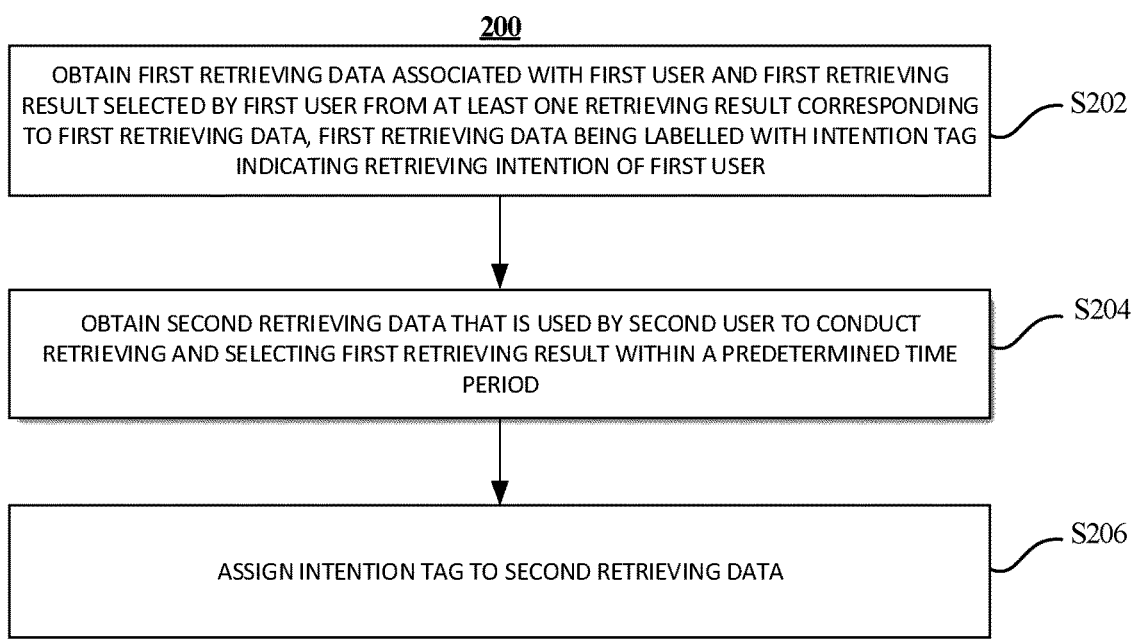
FIG. 2 shows a flow diagram of a method for data processing according to an embodiment of the present disclosure.

FIG. 2 shows a flow diagram of a method 200 for data processing according to an embodiment of the present disclosure. As shown in FIG. 2, the flow diagram of the method 200 according to the embodiment of the present disclosure includes the following steps:

S202, first retrieving data associated with a first user and a first retrieving result selected by the first user from at least one retrieving result corresponding to the first retrieving data are obtained, wherein the first retrieving data is labelled with an intention tag indicating a retrieving intention of the first user;

S204, second retrieving data that is used by a second user to conduct retrieving and selecting the first retrieving result within a predetermined time period is obtained; and S206, the intention tag is assigned to the second retrieving data.

According to the method for data processing of the present disclosure, in consideration of the fact that the users selecting the same retrieving result are supposed to have the same retrieving intention, assuming that the retrieving intention of the first user for selecting a certain retrieving result to conduct retrieving through the first retrieving data is known, if the other second user selects the same retrieving result during his retrieving, it implies that the second user should have the same retrieving intention as the first user. By tracking the second retrieving data used by the second user to conduct retrieving, it may have the same intention tag as the first retrieving data. Therefore, a large amount of retrieving data labelled with the retrieving intention can be generated or created, and thus data enhancement of the training data can be achieved. In addition, the process of data enhancement does not rely on a traditional natural language processing mode (such as synonym replacement, noise adding, random word adding and deleting, etc.), and thus the diversity of the data can be improved.

In step S202, the first retrieving data that have been used by the first user and the first retrieving result selected by the first user from the corresponding at least one retrieving result may be obtained. For example, the first retrieving data may come from a certain user A. The process that the user A conducts retrieving on the first retrieving data through a search engine (such as the search engine developed by Baidu company) may be recorded and retained by the search engine. Assuming that the first retrieving data is a retrieving statement such as "what medicine should be taken for headache", at least one retrieving result may be generated after retrieving through the search engine. Accordingly, the retrieving result selected from the at least one retrieving result by the user A may also be obtained through the search engine.

Herein, the first retrieving data may be a piece of retrieving data, or may be a retrieving data set including a plurality of pieces of retrieving data, and its number is not limited in the present disclosure. In the case that the first retrieving data involves with the retrieving data set, the retrieving data included therein may come from different users, for example, from a user B, or a user C, etc., which is different from the user A. Accordingly, the obtained retrieving result also corresponds to the above individual users. These retrieving data may be associated with each other, or may not have any correlation with each other. In addition, in the case that the first retrieving data involves with the retrieving data set, the data volume of the retrieving data included therein, however, may be small. This is because for certain highly professional retrieving data, such as the medicine-related retrieving data as described above, the data volume may be inherently small since the labelling may lead to a large consumption of time and cost.

In addition, the first retrieving data may be the retrieving data that have been labelled with the retrieving intention. That is, the first retrieving data may have the intention tag, which may be used to indicate the retrieving intention of the first user.

According to some embodiments, the first retrieving data may be a text or an image. In this way, the data enhancement of various data can be achieved by utilizing the text searching and image searching functions provided by the search engine, such that the method of the present disclosure is not only suitable for the text-type data, but also can be extended to the image data.

In the case that the first retrieving data involves with the text, it may be in the form of a retrieval statement composed of a complete sentence, or may be in the form of retrieving words composed of a plurality of discrete words. For example, the first retrieving data may be a retrieving statement such as "what medicine should be taken for headache", and may also be retrieving words such as "headache medicine taking". Accordingly, the intention tag may indicate the retrieving intention about the medication query of the user. As a reference, for the medicine-related retrieving data as described above, there may be quite a lot fine-grained retrieving intentions involved, for example, a dozen of fine-grained retrieving intentions may be involved. In addition to the aforementioned retrieving intention about the medication query of the user, other retrieving intentions about e.g. the medication guidelines, the contraindications, the drug price comparison and so on may be included.

In the case that the first retrieving data involves with the image, it may be in the form of the image. That is, this situation may correspond to a function of "search by image" provided by the search engine. For example, the first retrieving data may be a picture about a Labrador dog. Accordingly, the intention tag carried by the first retrieving data may indicate a retrieving intention of the user about inquiring the dog type.

According to some embodiments, the at least one retrieving result includes at least one web link obtained by conducting retrieval on the first retrieving data. Taking an example that the first retrieving data of the user A is "what medicine should be taken for headache" as described above, a plurality of retrieving results, i.e., web titles that have respective web links, may be displayed on an interface of the search engine through the retrieving. Therefore, the web link clicked by the user A among these displayed retrieving results can be obtained.

A principle utilized in the present disclosure is set forth here. Assuming that the users clicking the same web link have the same retrieving intention, in the case that a web link clicked by the user A with the known retrieving intention is obtained, if another user, such as a user X, clicks the same web link as well during the retrieval, it indicates that this user should have the same retrieving intention as the user A. In this case, if the retrieving data used by the user X to conduct retrieving is traced back, it may have the same intention tag as the first retrieving data. Thus, a large amount of retrieving data labelled with the retrieving intention can be generated or created.

Therefore, with the aid of the web links, the traceability of the retrieving data used by the second user to conduct retrieving is provided, which in turn provides a basis for the implement of the subsequent data enhancement.

According to some embodiments, the first retrieving result includes a web link selected by the first user for the first time or for the last time from the at least one web link.

Since the retrieving result is usually displayed in the form of a web title on a page of the search engine, where the web title may often reflect the actual retrieving intention of the user accurately, the retrieving result selected by the user for the first time or for the last time may be considered as an optimal retrieving result that best reflects the retrieving intention of the user. Therefore, the retrieving data with the accurate intention tag can be obtained.

In step S204, the principle as described above is utilized as follows: assuming that the users clicking the same web link have the same retrieving intention, if the retrieving data used by another user who clicks the same web link is traced back, it may have the same intention tag with the first retrieving data.

Similar to obtaining the first retrieving data and the first retrieving result of the first user, the corresponding retrieving data, i.e., the second retrieving data that is used by the second user to conduct retrieving may also be crawled through the search engine.

The predetermined time period may be set according to actual conditions, such as three months. Considering that the web links may have a situation of expiration over time, a length of the predetermined time period may be properly adjusted. For example, the retrieving data, such as "what are the medicines for relieving headache" that is used by the user X, who clicks within three months the retrieving result (i.e., the web link) selected by the user A, may be crawled through the search engine.

In step S206, since the second retrieving data having the same retrieving intention as the first retrieving data in step S202 are obtained through step S204, the intention tag of the first retrieving data may then be assigned to the second retrieving data, so that a large amount of retrieving data labelled with the retrieving intention can be generated or created.

According to some embodiments, assigning the intention tag to the second retrieving data may further include determining whether the second user and the first user are the same; and in response to determining that the second user and the first user are not the same, labelling the second retrieving data with the intention tag.

In this way, the retrieving data used by the second user that is different from the first user can be obtained in the first place, so that diversified retrieval expressions that are used by these different users who have differences in aspects such as a personal background and an educational status etc. are utilized, thereby bringing even more data diversities to improve the data enhancement effect.

According to some embodiments, the first retrieving data and the second retrieving data may be combined as training data for training a classification model. Therefore, a large amount of retrieving data labelled with the retrieving intention can be generated or created.

Here, the classification model may be, for example, a model for short text classification. The present disclosure does not limit the types of the neural networks adopted by the model. For example, it may be a deep neural network model.

As described above, according to the method for data processing of the present disclosure, in consideration of the fact that the users selecting the same retrieving result are supposed to have the same retrieving intention, assuming that the retrieving intention of the first user for selecting a certain retrieving result to conduct retrieving through the first retrieving data is known, if the other second user selects the same retrieving result during his retrieving, it implies that the second user should have the same retrieving intention as the first user. By tracking the second retrieving data used by the second user to conduct retrieving, it may have the same intention tag as the first retrieving data. Therefore, a large amount of retrieving data labelled with the retrieving intention can be generated or created, and thus data enhancement of the training data can be achieved. In addition, the process of data enhancement does not rely on a traditional natural language processing mode (such as synonym replacement, noise adding, random word adding and deleting, etc.), and thus the diversity of the data can be improved.

Figure 3A:
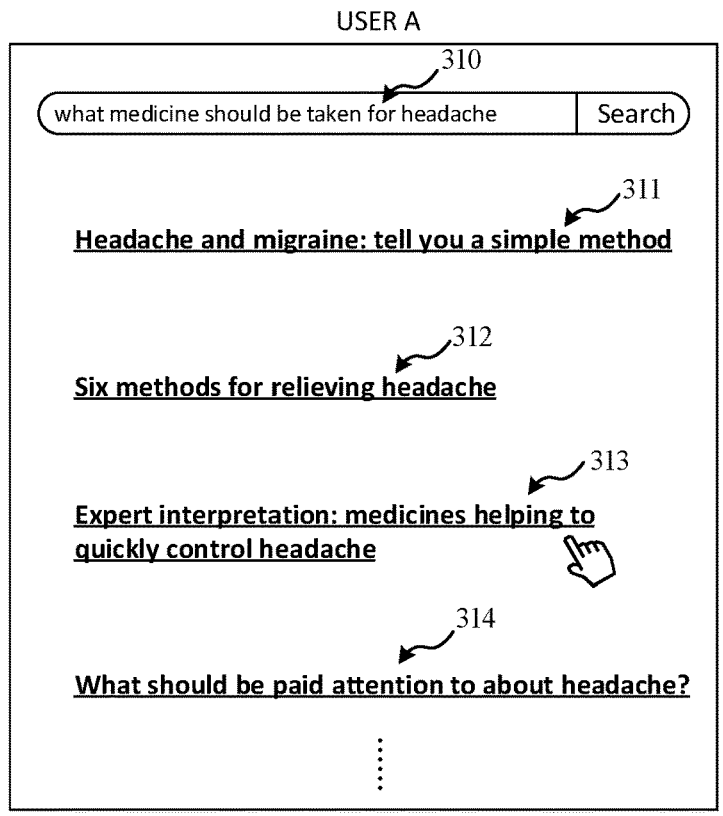
FIG. 3A and FIG. 3B show schematic diagrams used to illustrate a method for data processing according to an embodiment of the present disclosure.
Figure 3B:
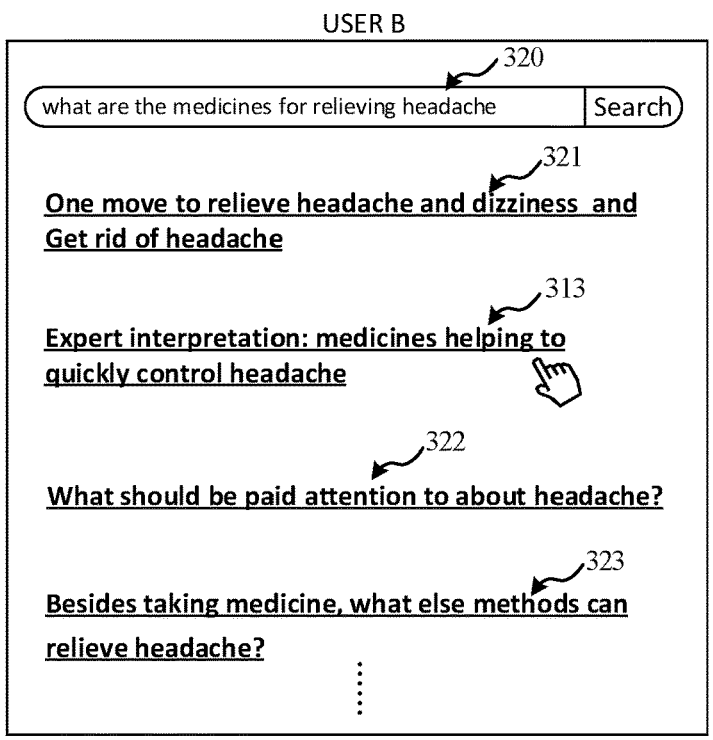

FIG. 3A and FIG. 3B show schematic diagrams used to illustrate a method for data processing according to an embodiment of the present disclosure.

FIG. 3A exemplarily shows an example of retrieving data 310 "what medicine should be taken for headache" associated with the user A and a selection of a retrieving result 313 from a plurality of retrieving results 311 to 314 by the user A. As shown in FIG. 3A, the plurality of web links 311 to 314 obtained through retrieval are shown, among which the web link 313 is the web link that is clicked by the user for the first time. As described above, the retrieving data 310 has been labelled with the intention tag for the retrieving intention of the user A. For example, the intention tag may indicate the retrieving intention of performing the medication query of the user A.

FIG. 3B shows a retrieval history of the user B who clicks the same web link 313 within three months, which is crawled through the search engine. As shown in FIG. 3B, retrieving data 320 used by the user B who clicks the same web link 313 to conduct retrieving is "what are the medicines for relieving headache" as shown. That is, the user B clicks the web link 313 from the plurality of web links 321, 313, 322 and 323. Therefore, the retrieving data 320 of the user B and the retrieving data 310 of the user A may be made to have the same intention tag. The intention tag may indicate the retrieving intention of performing medication query of the user B.

In this way, more retrieving data labelled with the retrieving intention, such as the retrieving data 320, can be generated or created based on the retrieving data 310 labelled with the retrieving intention associated with the user A, so that the data enhancement of the training data is achieved. In addition, the data enhancement process does not rely on a traditional natural language processing mode (such as synonym replacement, noise adding, random word adding and deleting, etc.), and thus the diversity of the data can be improved.

According to another aspect of the present disclosure, a method for training a classification model is further provided, including receiving training data obtained through the method as described above; and training the classification model by using the training data.

Figure 4:
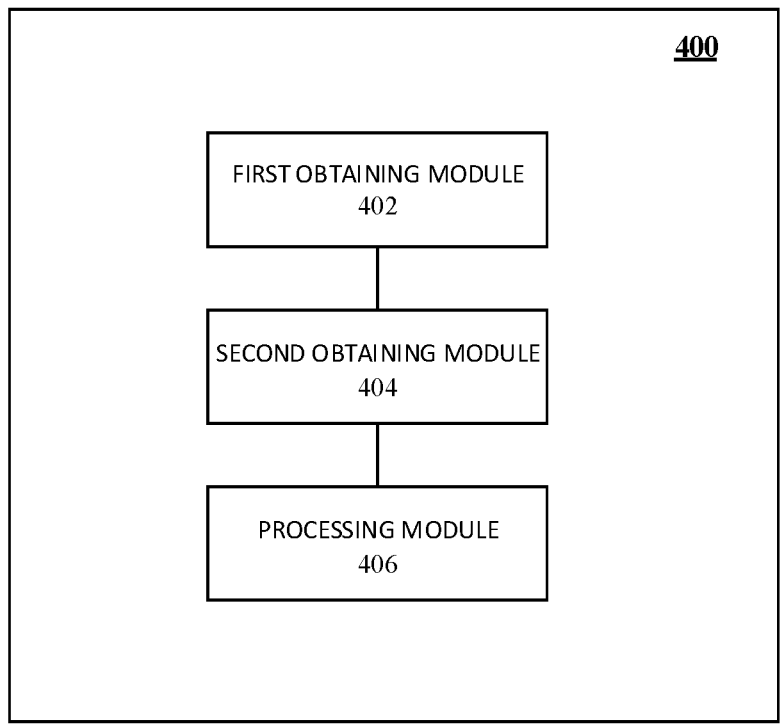
FIG. 4 shows a block diagram of a data processing apparatus according to an embodiment of the present disclosure.

According to another aspect of the present disclosure, an apparatus for data processing is further provided. FIG. 4 shows a block diagram of an apparatus 400 for data processing according to an embodiment of the present disclosure. As shown in FIG. 4, the apparatus 400 may include a first obtaining module 402 configured to obtain first retrieving data associated with a first user and a first retrieving result selected by the first user from at least one retrieving result corresponding to the first retrieving data, wherein the first retrieving data is labelled with an intention tag indicating a retrieving intention of the first user; a second obtaining module 404 configured to obtain second retrieving data that is used by a second user to conduct retrieving and selecting the first retrieving result within a predetermined time period; and a processing module 406 configured to assign the intention tag to the second retrieving data.

According to some embodiments, the first retrieving data includes a text or an image.

According to some embodiments, the at least one retrieving result includes at least one web link obtained by conducting retrieving on the first retrieving data.

According to some embodiments, the first retrieving result includes a web link selected by the first user for the first time or for the last time from the at least one web link.

The operations performed by the above modules 402, 404 and 406 correspond to steps S202, S204 and S206 described with reference to FIG. 2 and FIGS. 3A and 3B, and thus the details thereof are omitted.

Figure 5:
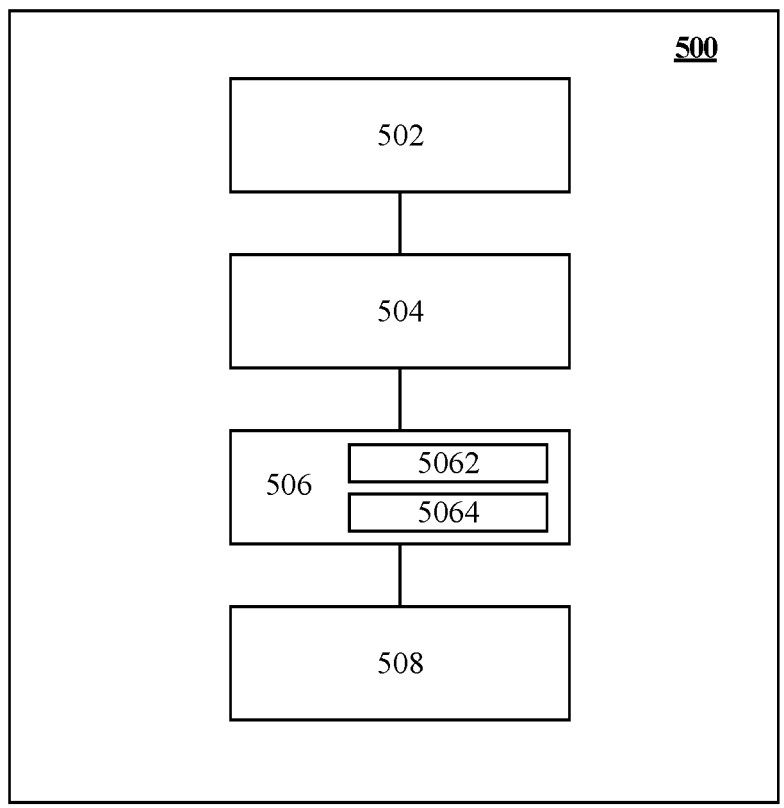
FIG. 5 shows a block diagram of a data processing apparatus according to another embodiment of the present disclosure.

FIG. 5 shows a block diagram of an apparatus 500 for data processing according to another embodiment of the present disclosure. Modules 502, 504 and 506 as shown in FIG. 5 may correspond to the modules 402, 404 and 406 as shown in FIG. 4, respectively. In addition, the apparatus 500 may further include a functional module 508, and the module 506 may further include sub-functional modules, as will be specifically described below.

According to some embodiments, the processing module 506 may further include a determining module 5062 configured to determine whether the second user and the first user are the same; and a labelling module 5064 configured to in response to determining that the second user and the first user are not the same, labelling the second retrieving data with the intention tag.

According to some embodiments, the apparatus 500 may further include a combining module 508 configured to combine the first retrieving data and the second retrieving data as training data for training a classification model.

The operations performed by the modules described in combination with FIG. 5 may correspond to the steps of the method described with reference to FIG. 2 and FIGS. 3A and 3B, and thus the details thereof are omitted.

According to another aspect of the present disclosure, a non-transitory computer readable storage medium storing computer instructions is further provided, wherein the computer instructions are used to cause a computer to execute the method as described above.

According to another aspect of the present disclosure, a computer program product is further provided, including a computer program, wherein the computer program, when executed by a processor, implements the method as described above.

According to another aspect of the present disclosure, an electronic device is further provided, including at least one processor; and a memory in communication connection with the at least one processor, wherein the memory stores instructions executable by the at least one processor, and the instructions, when executed by the at least one processor, cause the at least one processor to execute the method as described above.

Figure 6:
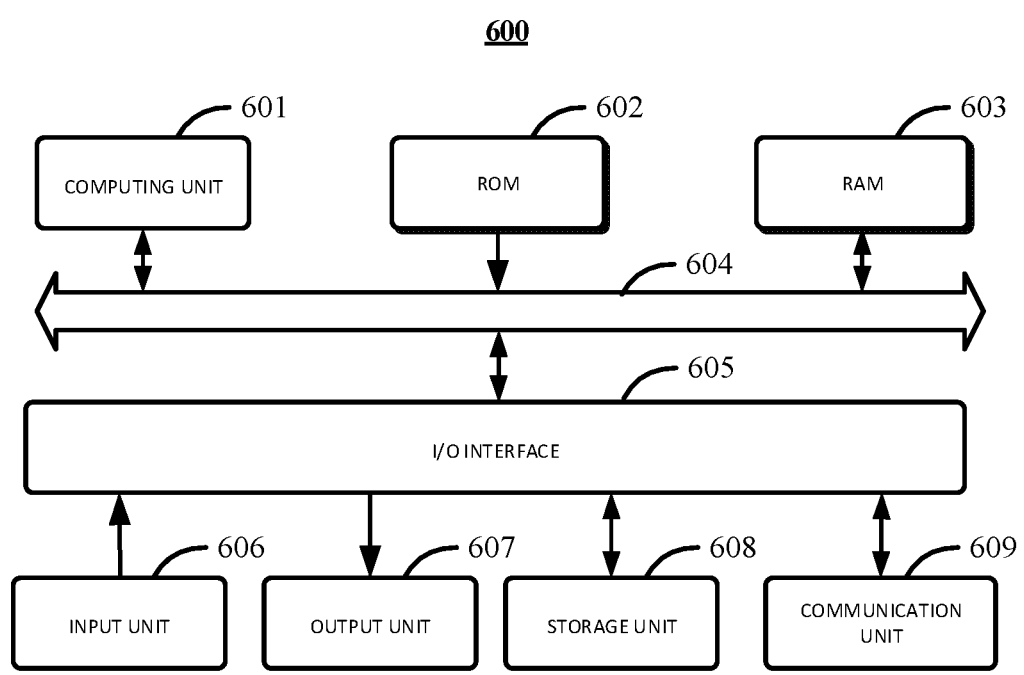
FIG. 6 shows a structural block diagram of an electronic device capable of being applied to an embodiment of the present disclosure.

Referring to FIG. 6, a structural block diagram of an electronic device 600 that may be applied to the present disclosure will be described, and it is an example of a hardware device that may be applied to various aspects of the present disclosure. The electronic device is intended to represent various forms of digital electronic computer devices, such as, a laptop computer, a desktop computer, a workstation, a personal digital assistant, a server, a blade server, a mainframe computer, and other suitable computers. The electronic device may further represent various forms of mobile apparatuses, such as, personal digital processing, a cell phone, a smart phone, a wearable device and other similar computing apparatuses. The components shown herein, their connections and relationships, and their functions are merely used as examples, and are not intended to limit the implementations of the present disclosure described and/or required herein.

As shown in FIG. 6, the electronic device 600 includes a computing unit 601 that may perform various appropriate actions and processing according to computer programs stored in a read-only memory (ROM) 602 or computer programs loaded from a storage unit 608 into a random access memory (RAM) 603. In the RAM 603, various programs and data required for operations of the electronic device 600 may further be stored. The computing unit 601, the ROM 602 and the RAM 603 are connected to each other through a bus 604. An input/output (I/O) interface 605 is also connected to the bus 604.

A plurality of components in the electronic device 600 are connected to the I/O interface 605, including: an input unit 606, an output unit 607, a storage unit 608 and a communication unit 609. The input unit 606 may be any type of device capable of inputting information to the electronic device 600. The input unit 606 may receive input digital or character information and generate key signal input related to user settings and/or function control of the electronic device, and may include but not limited to a mouse, a keyboard, a touch screen, a trackpad, a trackball, a joystick, a microphone and/or a remote control. The output unit 607 may be any type of device capable of presenting information, and may include but not limited to a display, a speaker, a video/audio output terminal, a vibrator and/or a printer. The storage unit 608 may include but not limited to a magnetic disk and an optical disk. The communication unit 609 allows the electronic device 600 to exchange information/data with other devices through computer networks such as the Internet and/or various telecommunication networks, and may include but not limited to a modem, a network card, an infrared communication device, a wireless communication transceiver and/or a chipset, such as a Bluetooth device, a 802.11 device, a WiFi device, a WiMax device, a cellular communication device and/or the like.

The computing unit 601 may be various general-purpose and/or special-purpose processing components with processing and computing capabilities. Some examples of the computing unit 601 include but not limited to a central processing unit (CPU), a graphics processing unit (GPU), various dedicated artificial intelligence (AI) computing chips, various computing units running machine learning model algorithms, a digital signal processor (DSP), and any appropriate processor, controller, microcontroller, etc. The computing unit 601 performs various methods and processing described above, such as the method for data processing. For example, in some embodiments, the method for data processing may be implemented as a computer software program that is tangibly included in a machine readable medium, such as the storage unit 608. In some embodiments, part or all of the computer programs may be loaded and/or installed onto the electronic device 600 via the ROM 602 and/or the communication unit 609. When the computer programs are loaded into the RAM 603 and executed by the computing unit 601, one or more steps of the method for data processing described above may be performed. Alternatively, in other embodiments, the computing unit 601 may be configured to perform the method for data processing in any other suitable manner (for example, by means of firmware).

Various implementations of the systems and technologies described above herein may be implemented in a digital electronic circuit system, an integrated circuit system, a field programmable gate array (FPGA), an application specific integrated circuit (ASIC), an application specific standard part (ASSP), a system on chip (SOC), a load programmable logic device (CPLD), computer hardware, firmware, software and/or their combinations. These various implementations may include: being implemented in one or more computer programs, wherein the one or more computer programs may be executed and/or interpreted on a programmable system including at least one programmable processor, and the programmable processor may be a special-purpose or general-purpose programmable processor, and may receive data and instructions from a storage system, at least one input apparatus, and at least one output apparatus, and transmit the data and the instructions to the storage system, the at least one input apparatus, and the at least one output apparatus.

Program codes for implementing the methods of the present disclosure may be written in any combination of one or more programming languages. These program codes may be provided to processors or controllers of a general-purpose computer, a special-purpose computer or other programmable data processing apparatuses, so that when executed by the processors or controllers, the program codes enable the functions/operations specified in the flow diagrams and/or block diagrams to be implemented. The program codes may be executed completely on a machine, partially on the machine, partially on the machine and partially on a remote machine as a separate software package, or completely on the remote machine or server.

In the context of the present disclosure, a machine readable medium may be a tangible medium that may contain or store a program for use by or in connection with an instruction execution system, apparatus or device. The machine readable medium may be a machine readable signal medium or a machine readable storage medium. The machine readable medium may include but not limited to an electronic, magnetic, optical, electromagnetic, infrared, or semiconductor system, apparatus or device, or any suitable combination of the above contents. More specific examples of the machine readable storage medium will include electrical connections based on one or more lines, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination of the above contents.

In order to provide interactions with users, the systems and techniques described herein may be implemented on a computer, and the computer has: a display apparatus for displaying information to the users (e.g., a CRT (cathode ray tube) or LCD (liquid crystal display) monitor); and a keyboard and a pointing device (e.g., a mouse or trackball), through which the users may provide input to the computer. Other types of apparatuses may further be used to provide interactions with users; for example, feedback provided to the users may be any form of sensory feedback (e.g., visual feedback, auditory feedback, or tactile feedback); an input from the users may be received in any form (including acoustic input, voice input or tactile input).

The systems and techniques described herein may be implemented in a computing system including background components (e.g., as a data server), or a computing system including middleware components (e.g., an application server) or a computing system including front-end components (e.g., a user computer with a graphical user interface or a web browser through which a user may interact with the implementations of the systems and technologies described herein), or a computing system including any combination of such background components, middleware components, or front-end components. The components of the system may be interconnected by digital data communication (e.g., a communication network) in any form or medium. Examples of the communication network include: a local area network (LAN), a wide area network (WAN) and the Internet.

A computer system may include a client and a server. The client and the server are generally far away from each other and usually interact through a communication network. The relationship between the client and the server is generated by computer programs running on the corresponding computer and having a client-server relationship with each other.

It should be understood that the various forms of processes shown above may be used to reorder, add, or delete steps. For example, the steps recorded in the present disclosure may be performed in parallel, sequentially or in different orders, as long as the desired results of the technical solution disclosed by the present disclosure can be achieved, which is not limited herein.

In the technical solution of the present disclosure, the acquisition, storage and application of involved personal information of users all comply with the provisions of relevant laws and regulations, and do not violate public order and good customs. The intent of the present disclosure is that personal information data should be managed and processed in a manner that minimizes the risk of inadvertent or unauthorized access to use. The risk is minimized by limiting data collection and deleting data when it is no longer needed. It should be noted that all information related to personnel in the present disclosure is collected with the knowledge and consent of the personnel.

Although the embodiments or examples of the present disclosure have been described with reference to the accompanying drawings, it should be understood that the above methods, systems and devices are only example embodiments or examples, and the scope of the present invention is not limited by these embodiments or examples, but only by the authorized claims and their equivalent scope. Various elements in the embodiments or examples may be omitted or replaced by their equivalent elements. In addition, the steps may be performed in an order different from that described in the present disclosure. Further, various elements in the embodiments or examples may be combined in various ways. It is important that as technology evolves, many of the elements described herein may be replaced by equivalent elements that appear after the present disclosure.

The invention claimed is:

1. A method for data processing, comprising:
    obtaining first retrieving data associated with a first user that is used by the first user to conduct retrieving, and a first retrieving result selected by the first user from at least one retrieving result corresponding to the first retrieving data, wherein the first retrieving data is labelled with an intention tag indicating a retrieving intention of the first user;
    obtaining second retrieving data that is used by a second user to conduct retrieving and selecting the same first retrieving result from at least one retrieving result corresponding to the second retrieving data within a predetermined time period;
    assigning the intention tag to the second retrieving data; and
    combining the first retrieving data and the second retrieving data as training data for training a classification model.

2. The method of claim 1, wherein the first retrieving data comprises a text or an image.

3. The method of claim 1, wherein the at least one retrieving result includes at least one web link obtained by conducting retrieving on the first retrieving data.

4. The method of claim 3, wherein the first retrieving result includes a web link selected by the first user for a first time or for a last time from the at least one web link.

5. The method of claim 1, wherein assigning the intention tag to the second retrieving data comprises:
    determining whether the second user and the first user are the same; and
    in response to determining that the second user and the first user are not the same, labelling the second retrieving data with the intention tag.

6. An electronic device, comprising:
    at least one processor; and
    a memory in communication connection with the at least one processor,
    wherein the memory stores instructions executable by the at least one processor, and the instructions, when executed by the at least one processor, cause the at least one processor to perform processing comprising:
        obtaining first retrieving data associated with a first user that is used by the first user to conduct retrieving and a first retrieving result selected by the first user from at least one retrieving result corresponding to the first retrieving data, wherein the first retrieving data is labelled with an intention tag indicating a retrieving intention of the first user;
        obtaining second retrieving data that is used by a second user to conduct retrieving and selecting the same first retrieving result from at least one retrieving result corresponding to the second retrieving data within a predetermined time period;
        assigning the intention tag to the second retrieving data; and
        combining the first retrieving data and the second retrieving data as training data for training a classification model.

7. The electronic device of claim 6, wherein the first retrieving data comprises a text or an image.

8. The electronic device of claim 6, wherein the at least one retrieving result includes at least one web link obtained by conducting retrieving on the first retrieving data.

9. The electronic device of claim 8, wherein the first retrieving result includes a web link selected by the first user for a first time or for a last time from the at least one web link.

10. The electronic device of claim 6, wherein assigning the intention tag to the second retrieving data comprises:
    determining whether the second user and the first user are the same; and
    in response to determining that the second user and the first user are not the same, labelling the second retrieving data with the intention tag.

11. A non-transitory computer readable storage medium storing computer instructions, wherein the computer instructions are configured to cause a computer to perform processing comprising:
    obtaining first retrieving data associated with a first user that is used by the first user to conduct retrieving and a first retrieving result selected by the first user from at least one retrieving result corresponding to the first retrieving data, wherein the first retrieving data is labelled with an intention tag indicating a retrieving intention of the first user;
    obtaining second retrieving data that is used by a second user to conduct retrieving and selecting the same first retrieving result from at least one retrieving result corresponding to the second retrieving data within a predetermined time period;
    assigning the intention tag to the second retrieving data; and
    combining the first retrieving data and the second retrieving data as training data for training a classification model.

12. The non-transitory computer readable storage medium of claim 11, wherein the first retrieving data comprises a text or an image.

13. The non-transitory computer readable storage medium of claim 11, wherein the at least one retrieving result includes at least one web link obtained by conducting retrieving on the first retrieving data.

14. The non-transitory computer readable storage medium of claim 13, wherein the first retrieving result includes a web link selected by the first user for a first time or for a last time from the at least one web link.

15. The non-transitory computer readable storage medium of claim 11, wherein assigning the intention tag to the second retrieving data comprises:
    determining whether the second user and the first user are the same; and in response to determining that the second user and the first user are not the same, labelling the second retrieving data with the intention tag.

* * * * *